Dec. 15, 1936.     H. SALVATORI     2,064,385

APPARATUS FOR DETERMINING SUBSURFACE GEOLOGICAL FORMATIONS

Filed July 3, 1935

INVENTOR
Henry Salvatori
BY George L. Parkhurst
ATTORNEY

Patented Dec. 15, 1936

2,064,385

UNITED STATES PATENT OFFICE 2,064,385

APPARATUS FOR DETERMINING SUBSURFACE GEOLOGICAL FORMATIONS

Henry Salvatori, Hollywood, Calif., assignor to Western Geophysical Company, Tulsa, Okla., a corporation of Delaware Application July 3, 1935, Serial No. 29,679

3 Claims. (Cl. 181—0.5)

This invention relates to new and useful improvements in the art of determining the nature and position of sub-surface geological formations by means of seismic waves and has particular reference to an improved method whereby the times of arrival of the reflected impulses can be detected and recognized by means of a plurality of seismometers and oscillograph elements or the like connected in such manner as to cause an overlap or gradual transition from trace to trace on the oscillograph record.

Methods commonly used depend on the fact that elastic waves in the earth travel through different materials with different rates of speed and in passing from one medium to another of different velocity value, part of the wave is transmitted and part reflected and returned to the surface of the earth.

It is theoretically possible to time the arrival of a reflected artificial seismic wave by means of a single seismometer and recording device. However, in practice it is difficult and oftentimes impossible to pick out the reflected wave from the many other vibrations of the earth that are also recorded at the same time.

It has, therefore, been found necessary in practice to use a plurality of seismometers spread over a considerable distance along the earth's surface and to employ a plurality of recordings or "traces" on a single chart for comparative purposes. The plurality of traces on a single record furnishes corroborative evidence of the arrival of the reflected wave since the reflection pattern can be followed across the entire record.

The accuracy of the results from such records is largely dependent upon the degree of accuracy with which similar points of arrival of the reflected wave can be picked out on the various traces of the record. This is often difficult, if not impossible, due to the fact that the surface sediments are seldom uniform and the underlying strata from which reflections are received are often not parallel with the surface, so that with practicable spreads of the seismometers, the characteristics of the reflected waves are so changed from seismometer station to seismometer station as to make them unrecognizable.

The principal object of this invention is to overcome this difficulty and provide means whereby the times of arrival of the various reflected waves can be determined with a high degree of certainty.

On account of the nature of the invention, the specific objects and advantages thereof can be more readily understood in view of the following discussion with particular reference to the drawing in which.

Figure 1:
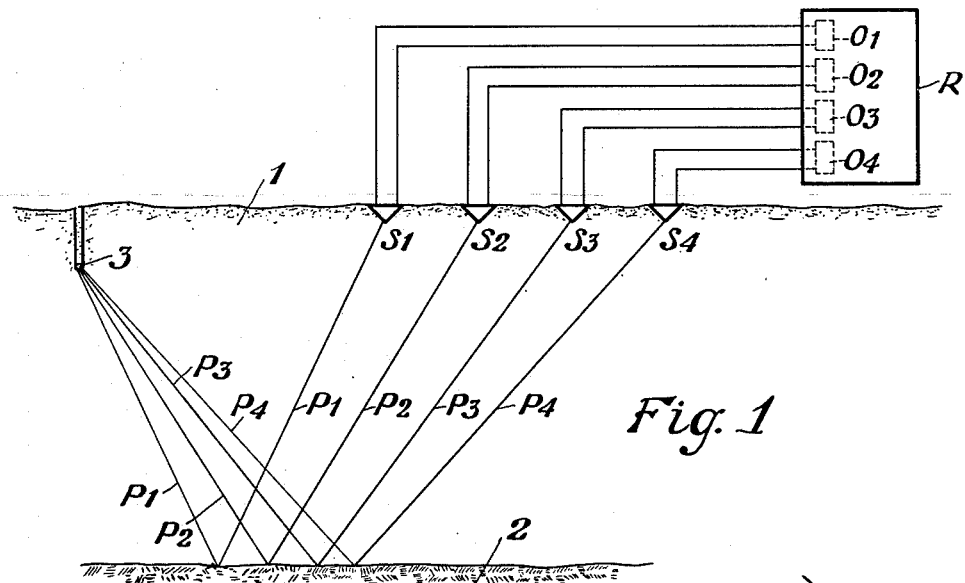
Figure 1 represents a vertical section through the earth showing a common method of connecting seismometers and recording devices.

As previously mentioned, it has been found necessary in practice to use a plurality of seismometers spread over a considerable distance along the earth's surface. Such an arrangement is shown by Figure 1 wherein surface sediments 1 are underlaid by a dense hard stratum 2 of substantially different characteristics which serves to reflect a portion of the seismic waves. In practice stratum 2 will usually be a deep stratum separated from the surface sediments 1 by a large number of intermediate strata. An artificial seismic wave is generated by detonating an explosive charge 3 which may suitably be placed in a hole somewhat below the earth's surface. The explosion generates seismic waves which proceed in all directions. Certain of these waves follow the paths $P_1$, $P_2$, $P_3$ and $P_4$ and a portion of the energy is reflected back to the surface to be detected by means of seismometers $S_1$, $S_2$, $S_3$ and $S_4$ which may suitably be of any known magneto-electric type or of any type which converts earth movements into varying electric currents. These seismometers are electrically connected to oscillograph strings (or coils) $O_1$, $O_2$, $O_3$ and $O_4$ in recorder R. The movements of these various oscillograph strings are commonly recorded photographically on a single moving sensitized strip.

It can readily be seen that the lengths of the various wave paths $P_1$, $P_2$, $P_3$ and $P_4$ will usually vary and that there will consequently be a variation in the times at which the effects of the reflected waves will appear on the record. It is also apparent, that if the sub-surface reflecting formation dips or slopes from the horizontal, it will change the distances of travel and consequent times of arrival of the reflected waves. If these various times of arrival can be accurately determined not only the depth, but also the dip of the sub-surface reflecting formation can be calculated by well known mathematical methods.

As previously stated, the non-homogeneous structure of the earth causes phase displacements and wave distortions that make it difficult to pick out the reflected wave from among the many other recorded vibrations of the earth due to other agencies than those of the reflected wave. This is well illustrated by Figure 2, which is a copy of an actual seismogram taken with the instruments connected as shown in Figure 1 except that six seismometers and oscillograph elements were used instead of four as shown in Figure 1. In this seismogram it is practically impossible to tell the exact points on the various curves which correspond to the reflected waves. In other cases it is difficult or impossible to recognize a reflection at all. It is to be noted that often the two waves are in opposition or about 180° out of phase as shown at "$a$" in Figure 2 where the second and third strings almost touch. Where the oscillograph strings are located close to each other this makes it necessary to restrict the amplitudes of the vibrating strings and consequently the details of the record may be lost.

Figure 3:
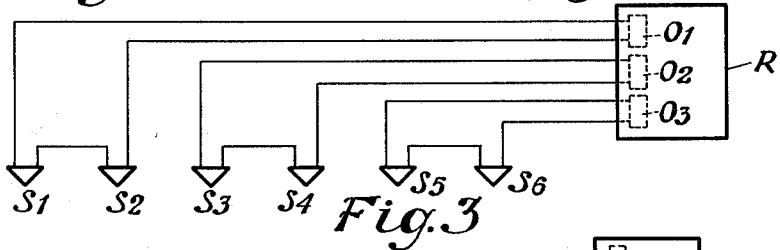
Figure 3 shows a plurality of seismometers connected to each recording unit.

It is often the practice to connect two or more seismometers in series groups to a single recording device to obtain greater sensitivity as shown in Figure 3 wherein seismometers $S_1$ and $S_2$ actuate oscillograph string $O_1$, seismometers $S_3$ and $S_4$ actuate oscillograph string $O_2$ and seismometers $S_5$ and $S_6$ actuate oscillograph string $O_3$. Usually these seismometers are spread apart so as to obtain an average result over a distance rather than a result at a point as in the case of a single seismometer. Under the above conditions the recorder records the algebraic sum of the currents generated by the various seismometers in the series group. What has been said about non-uniformity of curves and phase displacements applies equally to the group method of connection.

I overcome the difficulties mentioned by "overlapping" my seismometers or, in other words, by causing each oscillograph string to be actuated by more than one seismometer and by causing each seismometer, except the end seismometers, to actuate two or more oscillograph strings. The result is that each recorded curve or "trace" partakes to a certain extent of the characteristics of the traces adjacent to it so that there is a gradual transition from trace to trace which makes it possible to recognize the effects of a reflected wave with certainty and accuracy.

Figure 4:
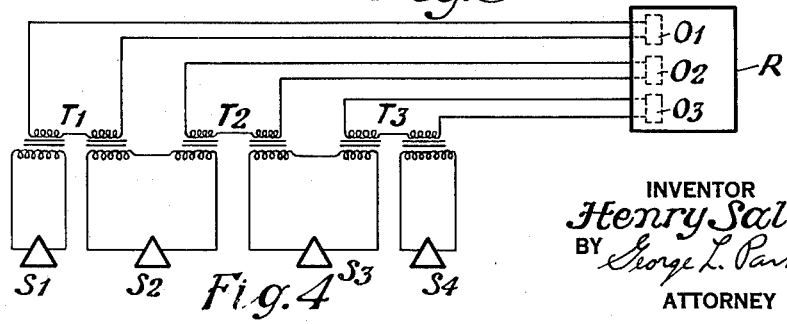
Figure 4 shows a plurality of seismometers connected to recording units in overlapped fashion in accordance with my invention.

This will be described more fully in conjunction with Figure 4 which illustrates one preferred form of my invention. In Figure 4 seismometers $S_1$ and $S_2$ both actuate oscillograph string $O_1$, seismometers $S_2$ and $S_3$ both actuate the oscillograph string $O_2$ and seismometers $S_3$ and $S_4$ both actuate the oscillograph string $O_3$. Further seismometers and further oscillograph strings can be used in like fashion and in practice I prefer to use from six to ten oscillograph strings.

As shown in Figure 4 the "overlapping" is accomplished through transformers and this is highly advantageous since the primary circuits are entirely separate and the possibility of crossfeed due to stray ground insulation leakages is entirely eliminated.

In Figure 4, it will be seen that each transformer $T_1$, $T_2$, and $T_3$ has two separate primaries connected in series with separate seismometers and two secondaries connected in series with each other. The secondary circuit from each transformer is lead through the customary amplification circuit and actuates a separate oscillograph string. The movements of all the oscillograph strings are photographically recorded on a single moving photographic strip in the conventional manner.

Elements $O_1$, $O_2$, $O_3$, etc. of the drawing may and usually will include the customary amplification circuits as well as the oscillograph elements.

It will be seen from Figure 4 that seismometer $S_2$ actuates both the first and second oscillograph strings $O_1$ and $O_2$ through transformers $T_1$ and $T_2$ respectively and that seismometer $S_3$ actuates both the second and third oscillograph strings $O_2$ and $O_3$ through transformers $T_2$ and $T_3$ respectively so that each record partakes 50% of the characteristic of the preceding record bringing about a greater resemblance between adjacent curves and making it easier to identify a reflection pattern as well as to identify particular points on the curves making up this reflection pattern. The apparatus of my invention is not limited to the 50% overlap illustrated, as it can readily be seen that with suitable arrangements of seismometers and transformers any pre-determined percentage of overlap may be obtained. Thus, for example, seismometers $S_1$, $S_2$ and $S_3$ could all actuate one oscillograph string, seismometers $S_2$, $S_3$ and $S_4$ could actuate the second, seismometers $S_3$, $S_4$ and $S_5$ the third, etc.

Furthermore, it will be readily apparent that instead of using a single seismometer in each primary circuit as shown in Figure 4, two or more seismometers can be used in series in each circuit thereby combining the advantages of the system shown in Figure 3 with the advantages of my present invention.

Figures 2, 5:
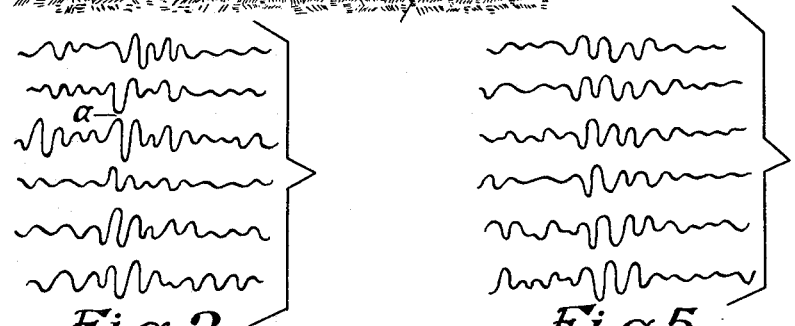
Figure 2 shows a chart recorded by the method shown in Figure 1.
Figure 5 shows a chart recorded in accordance with my invention.

The advantages to be gained by "overlapping" seismometers are evident by referring to Figure 5, which is a copy of a record to the same reflection as Figure 2, made under identical conditions and with the same equipment as used in making the record shown by Figure 2, except, that the seismometers were connected in accordance with my invention.

Here the reflection pattern is readily identified and easily measured. Also the phase change for adjacent curves is gradual and constant, so there is no instant at which the strings of the oscillograph are likely to come into contact with each other at large amplitudes and thus spoil the record at that point. Therefore, larger amplitudes can be used in the practice of my invention than when operating in accordance with the prior art and this results in greater accuracy and ease of interpretation.

It is not necessary to use a plurality of seismometers on each recording unit in order to accomplish the results described by this invention as the seismometer winding itself can be divided, so as to obtain the desired amount of overlap, or any of the well-known methods of voltage dividing may be employed, such as a potentiometer.

The fact that this method of recording the reflected seismic waves enables the identification of reflected waves with great certainty and permits the use of greater amplitudes in the recording instrument affords many advantages.

While I have described my invention in connection with a specific embodiment thereof and in connection with certain theories it is to be understood that these are by way of illustration rather than by way of limitation and I do not mean to be restricted thereby but only to the broadest valid interpretations of the appended claims which define the novel features of my invention.

I claim:

1. Apparatus for recording reflected seismic waves comprising a plurality of progressively spaced seismometers, a plurality of separate transformer primary circuits for said seismometers, said seismometers constituting a plurality of groups of adjacent seismometers, each of said groups containing at least one but less than all the seismometers of an adjacent group, the seismometers in each of said groups actuating a plurality of said separate transformer primary circuits, a separate recording device corresponding to each of said groups of seismometers and means for actuating each recording device jointly by the seismometers of the group corresponding to said recording device, said means comprising a transformer secondary circuit operatively associated with the corresponding transformer primary circuits actuated by the group of seismometers corresponding to said recording device.

2. Apparatus for exploring sub-surface geological formations which comprises three seismometers, three separate transformer primary circuits, two separate transformer secondary circuits, and two recording devices, means for actuating the first of said recording devices by one of said seismometers, said means including the first of said transformer primary circuits and the first of said transformer secondary circuits, means for actuating the second of said recording devices by another of said seismometers which does not actuate the first of said recording devices, said means including the second of said transformer primary circuits and the second of said transformer secondary circuits, and means for actuating both of said recording devices by the third of said seismometers, said means including the third of said transformer primary circuits and both of said transformer secondary circuits.

3. Apparatus for exploring sub-surface geological formations which comprises three spaced seismometers, three separate transformer primary circuits, two separate transformer secondary circuits, and two recording devices, means for actuating the first of said recording devices by one of said seismometers, said means including the first of said transformer primary circuits and the first of said transformer secondary circuits, means for actuating the second of said recording devices by another of said seismometers which does not actuate the first of said recording devices, said means including the second of said transformer primary circuits and the second of said transformer secondary circuits, and means for actuating both of said recording devices by the third of said seismometers, said means including the third of said transformer primary circuits and both of said transformer secondary circuits, said last-mentioned seismometer being located intermediate the other two of said three spaced seismometers.

HENRY SALVATORI.